(12) United States Patent
Dominique et al.

(10) Patent No.: US 9,290,158 B2
(45) Date of Patent: Mar. 22, 2016

(54) WINDSCREEN WASHER

(71) Applicant: VOLVO CAR CORPORATION, Gothenburg (SE)

(72) Inventors: Christer Dominique, Torslanda (SE); Anneli Johansson, Torslanda (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/295,489

(22) Filed: Jun. 4, 2014

(65) Prior Publication Data
US 2014/0367488 A1  Dec. 18, 2014

(30) Foreign Application Priority Data

Jun. 18, 2013  (EP) ..................... 13172521

(51) Int. Cl.
*B05B 1/10* (2006.01)
*B60S 1/50* (2006.01)
*B60S 1/48* (2006.01)

(52) U.S. Cl.
CPC ... *B60S 1/50* (2013.01); *B60S 1/481* (2013.01)

(58) Field of Classification Search
CPC ............ B60S 1/52; B60S 1/487; B60S 1/488; B60S 1/528
USPC ................................. 239/284.1, 284.2, 67–69
See application file for complete search history.

(56) References Cited

U.S. PATENT DOCUMENTS

| | | | | |
|---|---|---|---|---|
| 5,141,160 A | * | 8/1992 | Waters | 239/284.1 |
| 6,237,861 B1 | * | 5/2001 | Northrop et al. | 239/284.1 |
| 6,527,000 B1 | * | 3/2003 | Randmae et al. | 134/99.1 |
| 6,615,438 B1 | * | 9/2003 | Franco et al. | 15/250.02 |
| 2001/0054655 A1 | * | 12/2001 | Berg et al. | 239/284.1 |

FOREIGN PATENT DOCUMENTS

| | | |
|---|---|---|
| EP | 19800013 A1 | 7/1999 |
| EP | 1162118 A2 | 12/2001 |
| EP | 1857338 A1 | 11/2007 |

OTHER PUBLICATIONS

Extended European Search Report Dated Dec. 6, 2013, Application No. 13172521.0-1757, Applicant Volvo Car Corporation, 5 Pages.

* cited by examiner

*Primary Examiner* — Davis Hwu
(74) *Attorney, Agent, or Firm* — Brooks Kushman P.C.

(57) ABSTRACT

A window and/or lamp washer system for a vehicle comprising a washer fluid container, a washer fluid pump arranged in fluid communication with the washer fluid container, at least one washer fluid pressure tank for storing pressurized fluid, arranged in fluid communication with the washer fluid pump, and comprising a fluid inlet for receiving pressurized fluid from the pump and at least one fluid outlet for providing pressurized fluid in the form of a washer fluid jet, sensor means arranged to provide a signal representing the measured pressure within the at least one washer fluid pressure tank, a control unit connected to the sensor means and the washer fluid pump, and arranged to receive the signal, wherein the control unit is configured to operate the washer fluid pump based on the signal, whereby a signal representing a value below a predetermined level cause the pump to increase the pressure.

20 Claims, 3 Drawing Sheets

WINDSCREEN WASHER

CROSS-REFERENCE TO RELATED APPLICATIONS

This application claims foreign priority benefits under 35 U.S.C. §119(a)-(d) to European patent application number EP 13172521.0, filed Jun. 18, 2013, which is incorporated by reference in its entirety.

TECHNICAL FIELD

The disclosure relates to an improved window and/or lamp washer system for a vehicle and a method for controlling window and/or lamp washer system for vehicles.

BACKGROUND

Windshield washer systems are integral to maintain a clear visual field and thereby ensure the safety of drivers and passengers of vehicles, as well as bystanders or other drivers and passengers in traffic situations. Windshield and lamp washer systems have been in use for a long time. They often use a pump in connection with a washer fluid container to supply liquid through nozzles to a windshield and/or lamp which needs cleaning. The cleaning action is often manually initiated by the driver of the vehicle but can also be automated by sensors and control systems. One important characteristic of such a washer system is the amount of pressure and flow the system can produce, in order to ensure that the windshield and/or lamps are cleaned. Therefore, a pump with sufficient capacity to provide both flow and pressure high enough to ensure that a desirable amount of washer fluid is supplied at a high enough pressure to the windshield is commonly used in windshield washer systems. A pump with sufficient capacity will however have the obvious drawback of being expensive. Further, a pump with sufficient capacity will also require a large amount of electrical power at the start of the pumping action, hence the peak dimensioning of the electrical feeding to the pump will also be expensive. Thus it would be beneficial with a windshield and/or lamp washer system in which the costs for components may be lowered without compromising the effectiveness of the system.

SUMMARY

With regards to the above-mentioned desired properties of window and/or lamp washer system, it is a general object of the present disclosure to enable improved performance and reduced costs for window and/or lamp washer system and methods for controlling window and/or lamp washer systems.

According to a first aspect of the disclosure, these and other objectives are achieved through a window and/or lamp washer system for a vehicle comprising a washer fluid container, a washer fluid pump arranged in fluid communication with the washer fluid container, at least one washer fluid pressure tank for storing pressurized fluid, arranged in fluid communication with the washer fluid pump by fluid connecting means, and comprising a fluid inlet for receiving pressurized fluid from the washer fluid pump and at least one fluid outlet for providing pressurized fluid in the form of a washer fluid jet, sensor means arranged to provide a signal representing the measured pressure within the at least one washer fluid pressure tank, a control unit connected to the sensor means and the washer fluid pump, and arranged to receive the signal, wherein the control unit is configured to operate the washer fluid pump based on the signal, whereby the control unit is configured such that a signal indicating a pressure below a predetermined value operates the washer fluid pump to pump washer fluid from the washer fluid container to the at least one washer fluid pressure tank and increase the pressure in the at least one washer fluid pressure tank.

The present disclosure is based on the realization that by using a washer fluid pressure tank, energy can be stored as pressure in the washer fluid pressure tank. As a result, a pump with lower flow capacity that is operated to build up pressure can be used, and the pressure may be stored when the window and/or lamp washer system is not in use. The energy stored will enable the window and/or lamp washer system to require less power, thereby reducing the requirement for electrical feeds to the window and/or lamp washer system. Furthermore, cost savings can be realized for components in the system without affecting the effectiveness of the window and/or lamp washer system. Accordingly, an advantageous effect is achieved even if only a small amount of energy is stored, even though it may be desirable to store as much energy as possible under legal restrictions.

By window and/or lamp washer system for a vehicle it should be understood that the purpose of the system is the washing of windows and/or lamps on a vehicle, and that the washer fluid stored in the washer fluid pressure tank is the component performing this function.

The washer fluid container is understood to be an ordinary washer fluid container, with the purpose of containing washer fluid at atmospheric pressure. The washer fluid pump should be understood to pump washer fluid from the washer fluid container and increase the pressure in the washer fluid pressure tank. Further, the lower flow capacity of the pump relative to pumps used to pump washer fluid directly to a nozzle for providing a washer fluid jet means that the electrical feeds to the pump can be dimensioned for a lower peak electrical power.

Furthermore the washer fluid pressure tank should be understood to be able to contain pressurized washer fluid, whereby washer fluid pumped from the washer fluid container by the washer fluid pump enters the washer fluid pressure tank through the fluid inlet and is contained in the washer fluid pressure tank. The washer fluid pressure tank also comprises at least one fluid outlet, whereby washer fluid may exit the washer fluid pressure tank in the form of a washer fluid jet.

The sensor means (e.g., one or more pressure sensors) are arranged such that they are able to measure the pressure within the washer fluid pressure tank and provide a signal representing the measured pressure within the tank.

The control unit is connected to the sensor means and the washer fluid pump, and is arranged to receive the signal from the sensor means. Depending on the signal representing a measured pressure within the washer fluid pressure tank, the control unit is configured to operate the washer fluid pump if the signal indicates a pressure below a predetermined value. The pressure in the washer fluid pressure tank is thereby increased by the washer fluid pump until the signal indicates a measured pressure equal to or above a predetermined value, whereby operation of the pump is halted. At an initial stage when the system is started, e.g. when the driver starts a car where a system according to the disclosure is installed, the pressure indicated by the sensor means may be lower than the predetermined pressure, whereby the pump starts to operate and increases the pressure within the washer fluid pressure tank until the pressure is equal to or above the predetermined pressure. By above the predetermined pressure it should be understood that there a short time period before the signal from the sensor means reaches the control unit which halts operation of the pump, thereby the pressure in the washer fluid pressure tank may reach above the predetermined pressure before operation of the pump is halted. According to one exemplary embodiment a pressure drop due to a washing action may thereby quickly start operation of the pump. According to another exemplary embodiment, the control unit could also start operation of the pump when washer fluid exits the fluid outlet in the form of a washer fluid jet.

According to one exemplary embodiment of the disclosure the window and/or lamp washer system may further comprise a one way valve arranged at the fluid inlet of the washer fluid pressure tank, the one way valve being configured to prevent flow of liquid from the washer fluid pressure tank to the washer fluid container. Adding a one way valve ensures that no "backflow" can occur and harm or damage the washer fluid pump which would otherwise stop the washer fluid from flowing back to the washer fluid container. Further, a pressure that has been built up during an earlier time period, for example during a car ride earlier in the day, may be stored and in a later time period be used to wash a windshield or other equipment of the vehicle.

According to an exemplary embodiment of the disclosure the window and/or lamp washer system may further comprise at least one controllable valve in fluid communication with the at least one fluid outlet and at least one washer fluid jet nozzle in fluid communication with the at least one controllable valve wherein operation of the at least one controllable valve is arranged to release washer fluid from the washer fluid pressure tank to the at least one washer fluid jet nozzle. By arranging a controllable valve in fluid communication with the fluid outlet, a controlled and quick release of pressure from the washer fluid pressure tank to a washer fluid jet nozzle is provided. Further, the washer fluid jet nozzle may be arranged at an optimal position to spray a windshield, headlight or similar surface on a vehicle which needs cleaning, while the window and/or lamp washer system is arranged optimally within the vehicle.

In an exemplary embodiment the distance of the fluid communication between the controllable valve and the washer fluid jet nozzle is determined such that the amount of afterspit is minimized. Afterspit occurs at the end of the washing action, a slow cutoff of the flow due to low pressure will result in droplets of washer fluid reaching undesired surfaces, for example the hood of a car. By arranging the controllable valve close to the washer fluid jet nozzle, the afterspit may be almost entirely eliminated and the window and/or lamp washer system can be seen as firing in "burst mode" where the flow can be interrupted so quick that separate water bursts can be observed.

According to another exemplary embodiment of the disclosure the controllable valve may be arranged to be operated by a driver. To activate a washing action from the window and/or lamp washer system, a driver of the vehicle where the system is installed is preferably able to activate the system through an appropriate action. According to another exemplary embodiment the pump may be arranged to be operated when the controllable valve is opened. Operating the pump at the instant the controllable valve is opened will enable a longer washing period from the window and/or lamp washer system, due to washer fluid being pumped from the washer fluid container to the washer fluid pressure tank.

According to another exemplary embodiment of the disclosure the window and/or lamp washer system may further comprise a pressure throttling device arranged in between the at least one fluid outlet and the controllable valve. The pressure throttling device will limit at which pressure the washer fluid is able to pass the pressure throttling device and thereby allow the same amount of pressure to reach the washer fluid jet nozzle during a longer period of time while the pressure is dropping in the washer fluid pressure tank. A drop in the pressure reaching the washer fluid jet nozzle will first be observed, when a washing action long enough to drain the pressure in the washer fluid pressure tank below the pressure set in the pressure throttling device is performed. Further, it is possible to use a higher predetermined pressure and thereby store more energy in the washer fluid pressure tank due to the pressure throttling device lowering and thereby preventing washer liquid at too high pressure from leaving the system.

According to another exemplary embodiment of the disclosure the at least one controllable valve may be an electrical valve. An electrical valve is easily controlled and integrated in a vehicle and has a quick response time.

According to one exemplary embodiment of the disclosure the control unit may operate the washer fluid pump immediately if a pressure below a starting pressure is indicated by the signal. A starting pressure can advantageously be used to choose how quickly the control unit will start the operation of the pump when the pressure starts to drop as a result of a spraying action by the system. A small difference between the predetermined pressure and the starting pressure will enable a smaller time gap before the pumping operation begins. Further, by setting a starting pressure it is possible to have a pressure range, where the control unit does not start operation of the pump, thereby extending component lifetime by reducing the number of operations.

According to one exemplary embodiment of the disclosure the predetermined pressure may be at least 2 bar and preferably at least 4 bar. A pressure of 2 bar will enable a window and/or lamp washer system to store a sufficient amount of energy. Further, a pressure of at least 2 bar will spray the windshield or surface to be cleaned with a force which may be strong enough to dislodge hard adhering dirt. Advantageously a higher pressure, such as at least 4 bar may be used to store more energy, or achieve a stronger force when spraying a windshield or surface to be cleaned.

According to one exemplary embodiment of the disclosure, the washer fluid pressure tank may be deformed by the pressure. This could mean that the tank is able to expand as a safety precaution if the pressure rises too quickly or becomes too large. Further, the deformation in itself may be used as a "spring"-mechanism to enhance the energy storage by deforming the tank which will then try to reach its original shape.

According to another exemplary embodiment of the disclosure the washer fluid pressure tank or tanks may contain a compressible air pocket or a spring assembly. Air is more compressible than washer fluid, and as such may be more easily compressed to store energy, a spring assembly with a membrane mounted in the tank will allow the spring to compress and store energy while the membrane allows the spring to take up variable amount of volume.

According to another exemplary embodiment of the disclosure the connecting means may comprise a washer fluid hose. Advantageously, components commonly used for ordinary window and/or lamp washer system such as washer fluid hoses may be incorporated in the system.

According to one exemplary embodiment the system comprises 3-5 washer fluid pressure tanks. For a distributed window and/or lamp washer system in a vehicle, the washer fluid pressure tank should preferably be located in proximity to where each washer fluid pressure tank is supposed to deliver washer fluid. Hence, 3 to 5 washer fluid pressure tanks is a suitable number for covering the basic need for a car where washer fluid is needed. In one exemplary embodiment, if 5 washer fluid pressure tanks are installed in a vehicle up to three washer fluid pressure tanks may be used for the windshield and back window of the vehicle, and two washer fluid pressure tanks are used for headlights and/or backlights.

According to a second aspect of the present disclosure the objectives are achieved through a method for controlling a window and/or lamp washer system comprising a washer fluid container, a washer fluid pump arranged in fluid communication with the washer fluid container, at least one washer fluid pressure tank for storing pressurized fluid, arranged in fluid communication with the washer fluid pump by fluid connecting means, and a fluid inlet for receiving pressurized fluid from the pump and at least one fluid outlet for providing pressurized fluid in the form of a washer fluid jet, the method comprises measuring the pressure in the washer fluid pressure tank, and operating the washer fluid pump to pump washer fluid from the washer fluid container to the washer fluid pressure tank and increase the pressure, when the pressure is below a predetermined value.

According to one exemplary embodiment of the disclosure the system may further comprise at least one controllable valve in fluid communication with the at least one fluid outlet and at least one washer fluid jet nozzle in fluid communication with the at least one controllable valve, and the method may further comprise controlling the at least one controllable valve to release washer fluid from the washer fluid pressure tank to the at least one washer fluid jet nozzle, thereby spraying washer fluid upon a windshield or headlight.

According to another exemplary embodiment of the disclosure the method may further comprise the step of operating the pump as a response to controlling the controllable valve.

Advantages and the realization for the second aspect of the disclosure are largely analogous to the first aspect of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure such as the washing of headlights and/or a back window.

BRIEF DESCRIPTION OF THE DRAWINGS

These and other aspects of the present disclosure will now be described in more detail, with reference to the appended drawings showing embodiments of the disclosure.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of a window and/or lamp washer system according to the present disclosure are mainly discussed with reference to a windshield washer system on a car. It should be noted that this by no means limit the scope of the disclosure, which is also applicable in other circumstances, for example for use on other types of vehicles. Moreover the amount of washer fluid jets shown in the enclosed drawings is only a schematic representation. In use, the number of connected jets and other such details will be decided by each application.

Figure 1:
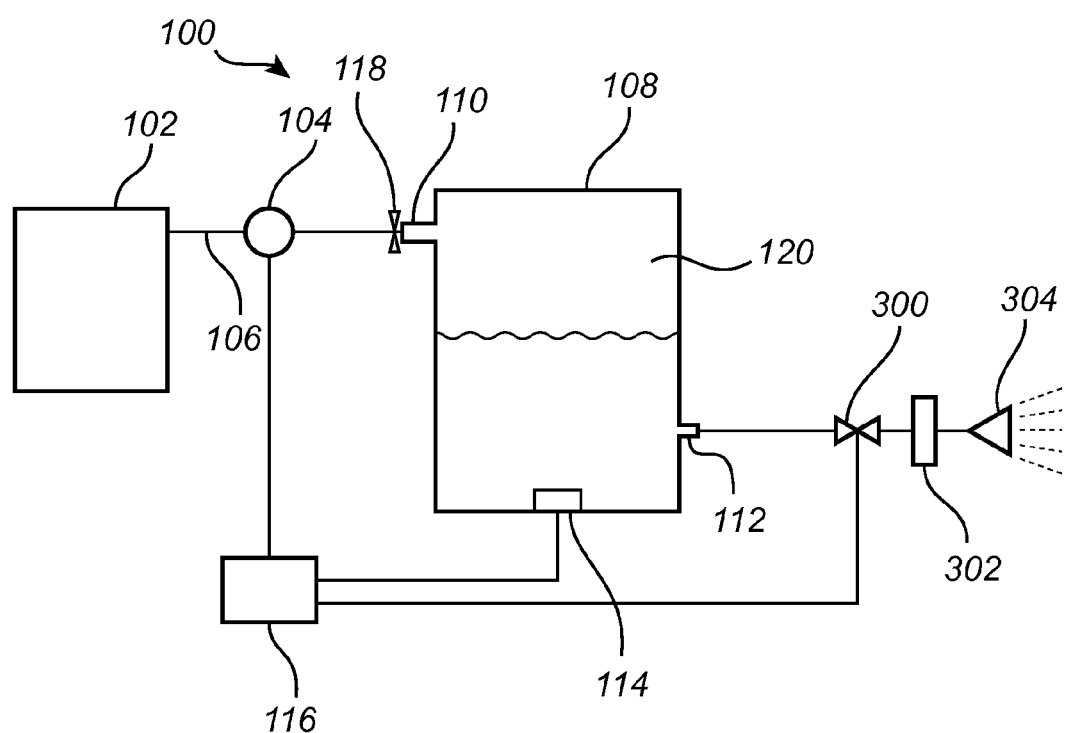
FIG. 1 is a schematic view of a window and/or lamp washer system according to a first embodiment of the disclosure.

In FIG. 1 a schematic representation of a windshield washer system 100 according to a first embodiment of the present disclosure is shown. A washer fluid container 102 is arranged in fluid communication with a washer fluid pump 104, the washer fluid pump 104 is further arranged in fluid communication with at least one washer fluid pressure tank 108. Operation of the washer fluid pump 104 will pump washer fluid from the washer fluid container 102 to the washer fluid pressure tank 108. The fluid communication is preferably effected through washer fluid hoses 106, however it should be noted that the washer fluid pump 104 may be arranged as close to either the washer fluid container 102 as possible or as close to the washer fluid pressure tank 108 as possible, even in contact. Thereby the need for washer fluid hoses 106 may be eliminated, through the washer fluid pump 104 being in fluid communication by itself. The washer fluid pressure tank 108 should be understood to be able to withstand any pressure for which the system is designed, for example 4 or 5 bar, and comprises a fluid inlet 110 which is in fluid communication through washer fluid hoses 106 with the washer fluid pump 104 for receiving washer fluid pumped by the washer fluid pump 104 from the washer fluid container 102. Further, the washer fluid pressure tank 108 comprises at least one fluid outlet 112 from where the washer fluid may exit to be able to spray upon a surface in the form of a washer fluid jet.

The pumping action by the washer fluid pump 104 is controlled by the control unit 116, and while the elements of the control unit 116 are typically implemented in hardware, and form part of an integrated unit normally referred to as a control unit, at least some portions of processing circuitry are typically embodied by software modules executed by an embedded processor. The disclosure is not restricted to this particular realization, and any implementation found suitable to realize the herein described functionality may be contemplated.

The control unit 116 is connected to sensor means 114 (e.g., a sensor), which are arranged to provide a signal representing the measured pressure within the washer fluid pressure tank 108. Based on the signal provided by the sensor means 114 to the control unit 116, the control unit 116 will operate the washer fluid pump 104 if the pressure within the washer fluid pressure tank 108 is below a predetermined value, for example 5 bar.

Additionally the windshield washer system shown in FIG. 1 may comprise a one way valve 118 which prevents backflow from the washer fluid pressure tank 108 to the washer fluid container 102, which could harm the washer fluid pump 104 or lower the effectiveness of the system.

The washer fluid pressure tank 108 may comprise an air pocket 120 or a spring with a membrane 120 to further enhance the possibility of storing energy as pressure within the washer fluid pressure tank 108. Air is more compressible than washer fluid, and as such may be more easily compressed to store energy, a spring with a membrane 120 mounted in the tank will allow the spring to compress and store energy while the membrane allows the spring to take up variable amount of volume.

To further realize an efficient windshield washer system the first embodiment shown in FIG. 1 further comprises a controllable valve 300 in fluid communication with the fluid outlet 112, which may be, as indicated, in communication with the control unit 116. Downstream of the controllable valve 300 is a pressure throttling device 302 and a washer fluid jet nozzle 304. The controllable valve 300 is controlled, preferably by a driver or operator of the vehicle in which the windshield washer system 100 is installed, to provide a controlled release of pressure from the washer fluid pressure tank 108 to the washer fluid jet nozzle 304 which will be mounted in a more optimal position for spraying e.g., upon a windshield than the washer fluid pressure tank 108 is able to be. The pressure throttling device 302 ensures that the pressure, which together with the diameter of the washer fluid hoses 106 determines the flow, is not too high when the washer fluid reaches the washer fluid jet nozzle 304. Further the pressure throttling device 302 has a configurable pressure, and if set at a lower pressure than the predetermined pressure will ensure that a longer washing action where a similar behavior of the washer fluid spraying from the washer fluid jet nozzle 304 is ensured. For example, if the predetermined pressure is 5 bar and the pressure throttling device 302 is set at 4 bar the pressure in the washer fluid pressure tank 108 is allowed to drop to 4 bar before the driver or operator notices the drop in pressure from the windshield washer system 100.

In use, when the system is initialized the control unit 116 will receive a signal from the sensor means 114, if the pressure is lower than the predetermined pressure the control unit 116 will operate the washer fluid pump 104 to pump washer fluid from the washer fluid container 102 through the washer fluid hoses 106, and through the one way valve 118 into the washer fluid pressure tank 108 until the washer fluid pressure tank 108 is full of washer fluid or when the washer fluid and the air pocket/spring and membrane 120 covers the entire internal volume of the washer fluid pressure tank 108. Then, the continued operation of the washer fluid pump 104 will start to raise the pressure within the washer fluid pressure tank 108 until the predetermined pressure is reached.

When a washing action is initiated by an operator/driver, by operating the controllable valve 300, the washer fluid under pressure is released to the pressure throttling device 302 where, if the pressure is higher than the pressure configured by the pressure throttling device 302, the pressure is reduced by the pressure throttling device 302 and the washer fluid is released through the washer fluid jet nozzle 304 and thereby sprayed upon a windshield, headlight or other equipment in the vehicle where the washer fluid jet nozzle 304 is arranged.

There are several options for when to activate the washer fluid pump 104. For example the washer fluid pump 104 may be set in operation when the controllable valve 300 is opened, or the washer fluid pump 104 may be set in operation when the pressure in the washer fluid pressure tank 108 drops below the predetermined pressure, or the washer fluid pump 104 may be set in operation as a starting pressure is reached in the washer fluid pressure tank 108 which would thereby provide a pressure range before the washer fluid pump 104 is operated. Some of the above combinations are of course combinable as well. For example by starting the washer fluid pump 104 as soon as possible for example concurrently with the controllable valve 300 a high pressure and flow will be maintained as long as possible. By delaying the operation of the washer fluid pump 104 for example by using a starting pressure, to create a pressure range where the washer fluid pump 104 is not operated, the lifetime of components is prolonged. An example of a pressure range created is a predetermined pressure of 5 bar and a starting pressure of 4.95 bar, which provides a range of 0.05 bar where a small instantaneous spray from the windshield washer system 100 will not be likely to activate the washer fluid pump 104 since just a small amount of washer fluid does not lower the pressure below the starting pressure.

Figure 2:
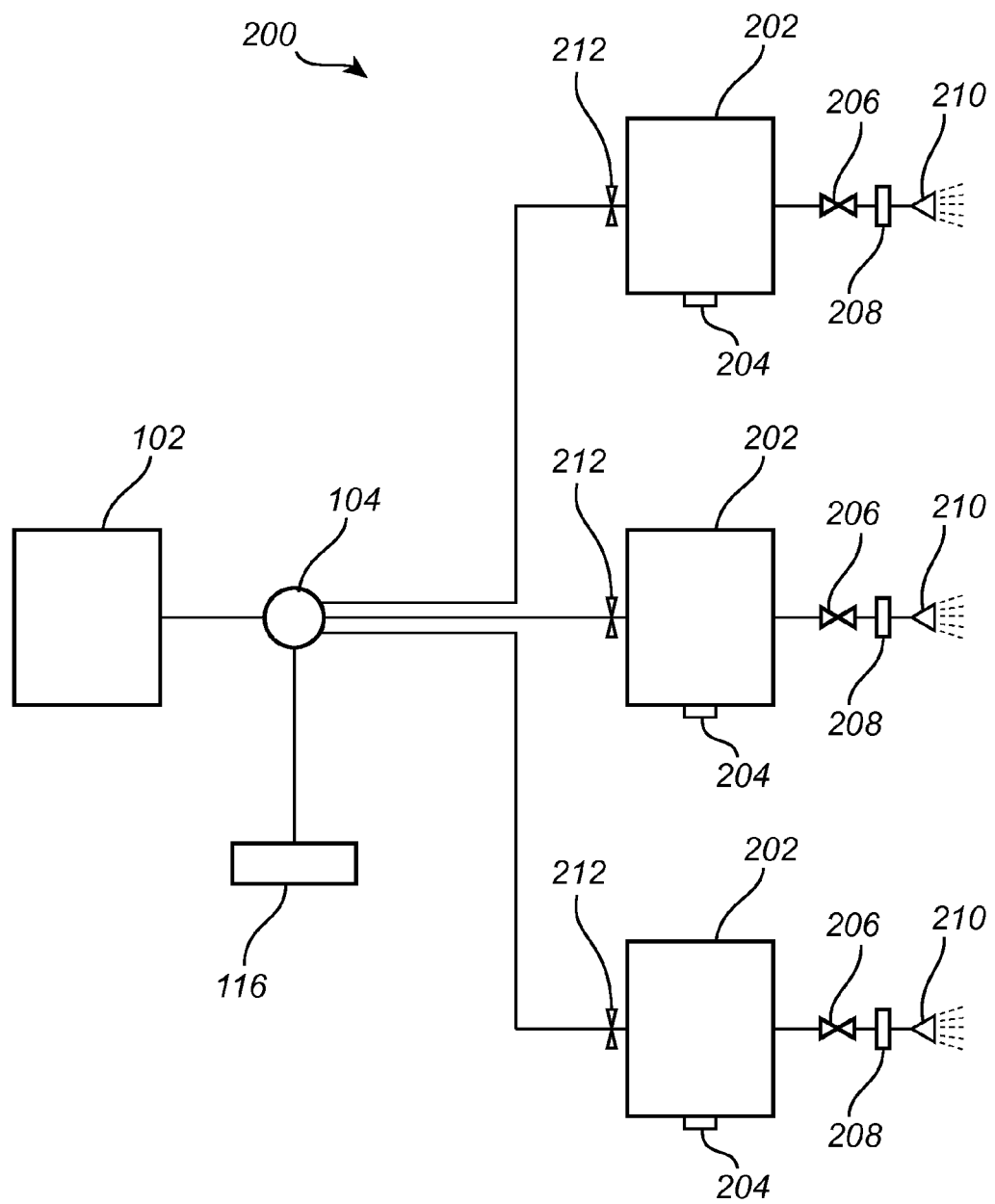
FIG. 2 is a schematic view of a window and/or lamp washer system according to a second embodiment of the disclosure.

Referring now to FIG. 2 where a second embodiment of a windshield washer system 200 according to the disclosure is shown. Similar to FIG. 1 a washer fluid container 102 is in fluid communication with a washer fluid pump 104, which in itself is in fluid communication with at least one, in the embodiment shown in FIG. 2 three, washer fluid pressure tanks 202. The embodiment shown in FIG. 2 thereby allows for a plurality of smaller washer fluid pressure tanks 202 to be mounted at the most advantageous position possible within a vehicle, such as close to the windshield, back window or headlight or in principle any surface which is to be cleaned or sprayed upon by the system. Furthermore, each washer fluid pressure tank 202 is preceded by a one way valve 212 which will stop washer fluid from flowing back towards the washer fluid container 102, which may harm the washer fluid pump 104 or otherwise be detrimental to the operation of the windshield washer system 200. The smaller volume of the washer fluid pressure tanks 202 shown means that it may be advantageous to use a higher pressure, for example above 30 bar.

Moreover, the windshield washer system 200 comprises controllable valves 206, pressure throttling devices 208 and washer fluid jet nozzles 210, all arranged downstream of their respective washer fluid pressure tanks 202. Each controllable valve 206 is controlled by the windshield washer system 200 to release washer fluid at pressure from a washer fluid pressure tank 202 to a washer fluid jet nozzle 210, whereby the pressure throttling device 208 only allows fluid at a certain pressure or below to pass the pressure throttling device 208. No connections between the control unit 116 and the sensor means 204 (e.g., sensors) are shown in FIG. 2, however the control unit 116 and the sensor means 204 and the controllable valve 206 are in connection in the embodiment shown in FIG. 2.

The pressure throttling devices 208 have a configurable pressure, whereby the washer fluid pressure tank 202, in use, comprising washer fluid at a pressure higher than the pressure setting of the pressure throttling device 208 will release the pressure through the controllable valve 206 where the pressure will be limited by the pressure throttling device 208 to the pressure at which it is configured, as described for the first embodiment shown in FIG. 1. The pressure throttling devices 208 has a further advantage in the embodiment shown in FIG. 2, the configurable pressure of the pressure throttling devices 208 makes it possible to have different spray pressures by different washer fluid jet nozzles 210, thereby providing the possibility to spray a windshield with a different pressure compared to a headlight for instance.

Figure 3A:
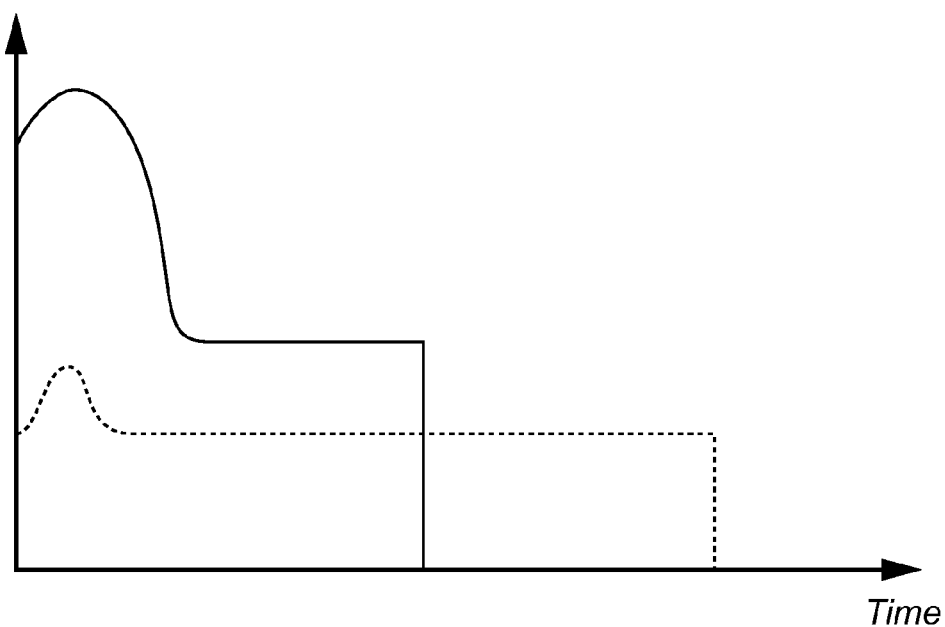
FIGS. 3A and 3B are graphs of the electrical energy required and flow provided from a prior art system compared to the new inventive window and/or lamp washer system according to an embodiment of the disclosure.
Figure 3B:
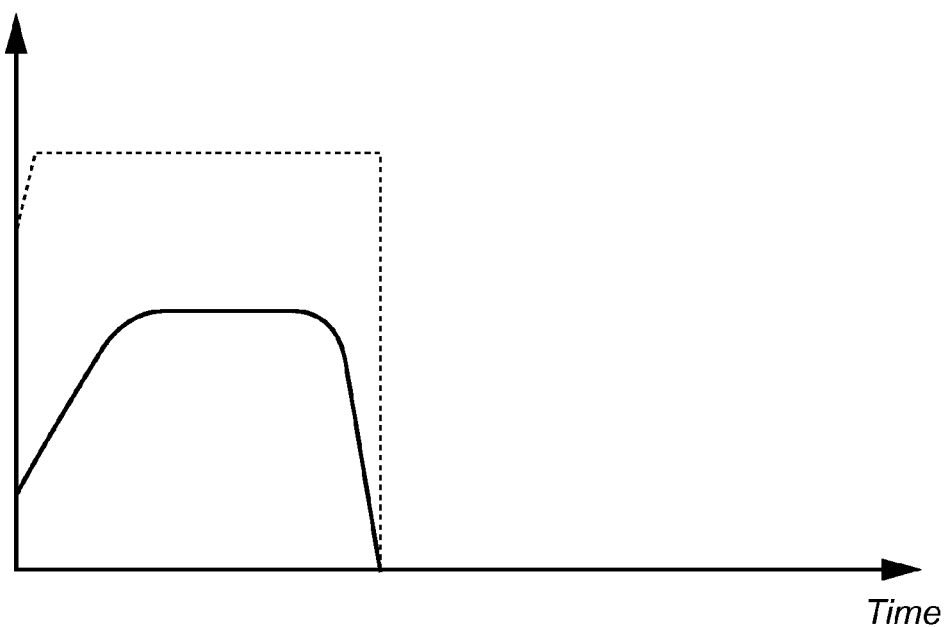

FIG. 3A shows a graph of the electrical power required at the start of the pumping action, where the dashed line represents the windshield washer system according to the disclosure and the solid line represents prior art windshield washer systems. Note how the electrical power requirement for the system using a pump pushing liquid to a nozzle is much higher, thereby requiring a larger dimensioning of the electrical feeds to the system. Further, the dashed line continues for a longer period of time which represents the time after the washing action when the smaller pump builds up pressure in the washer fluid pressure tank to store energy. In FIG. 3B a graph of the flow compared between the two system are shown, where it is noteworthy that even if the pump is smaller in the new windshield washer system proposed, the amount of liquid during washing action is higher due to the high pressure which have been built up prior to the washing action. Further, the sharp characteristic flow at the start and stop of the washing action is due to the controllable valve compared to the system using a pump pushing liquid to a nozzle.

Additionally, variations to the disclosed embodiments can be understood and effected by the skilled person in practicing the claimed invention, from a study of the drawings, the disclosure, and the appended claims. Examples of alternative systems not described in detail are of course a headlight washing system and a back/rear window washing system, or any combination of such systems with the inventive concept of the present application. Furthermore, the embodiments shown in the appended drawings reflect the inventive concept but some components such as the controllable valve, the pressure throttling device and the washer fluid jet nozzle should be understood to be less important than, say the washer fluid pump for the overall working of the system. Moreover, it is possible to operate the windshield washer system using any permutation of without one or two of the controllable valve 206, 300, the pressure throttling device 208, 302 and the washer fluid jet nozzle 210, 304. It should of course be noted that the connection between the control unit 116 and other components could be effected through any wireless solution as well. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A window and/or lamp washer system for a vehicle comprising;
    a washer fluid container;
    a washer fluid pump arranged in fluid communication with the washer fluid container;
    a washer fluid pressure tank for storing pressurized fluid, arranged in fluid communication with the washer fluid pump, and comprising a fluid inlet for receiving pressurized fluid from the washer fluid pump, at least one fluid outlet for providing pressurized fluid in the form of a washer fluid jet, and a compressible air pocket or a spring assembly;
    a sensor arranged to provide a signal representing measured pressure within the washer fluid pressure tank; and
    a control unit for receiving the signal;
    wherein the control unit is configured to operate the washer fluid pump based on the signal, whereby, when the signal indicates a pressure below a predetermined value, the control unit is configured to operate the washer fluid pump to pump washer fluid from the washer fluid container to the washer fluid pressure tank and increase the pressure in the washer fluid pressure tank.

2. The window and/or lamp washer system according to claim 1 further comprising a one way valve arranged at the fluid inlet of the washer fluid pressure tank, the one way valve being configured to prevent flow of liquid from the washer fluid pressure tank to the washer fluid container.

3. The window and/or lamp washer system according to claim 1 further comprising:
    at least one controllable valve in fluid communication with the at least one fluid outlet; and
    at least one washer fluid jet nozzle in fluid communication with the at least one controllable valve;
    wherein the at least one controllable valve is operable to release washer fluid from the washer fluid pressure tank to the at least one washer fluid jet nozzle.

4. The window and/or lamp washer system according claim 3 wherein the at least one controllable valve is arranged to be operated by a driver.

5. The window and/or lamp washer system according to claim 3 wherein the washer fluid pump is arranged to be operated when the at least one controllable valve is opened.

6. The window and/or lamp washer system according to claim 3 further comprising a pressure throttling device arranged in between the at least one washer fluid jet nozzle and the at least one controllable valve.

7. The window and/or lamp washer system according to claim 3 wherein the at least one controllable valve is an electrical valve.

8. The window and/or lamp washer system according to claim 1 wherein the control unit is configured to operate the washer fluid pump immediately if a pressure below a starting pressure is indicated by the signal.

9. The window and/or lamp washer system according to claim 1 wherein the predetermined pressure value is at least 2 bar.

10. The window and/or lamp washer system according to claim 1 wherein the predetermined pressure value is at least 4 bar.

11. The window and/or lamp washer system according to claim 1 wherein the washer fluid pump is connected to the washer fluid pressure tank by a washer fluid hose.

12. The window and/or lamp washer system according to claim 1 further comprising two or more additional washer fluid pressure tanks in fluid communication with the washer fluid pump.

13. The window and/or lamp washer system according to claim 1 wherein the washer fluid pressure tank comprises the spring assembly, and the spring assembly includes a membrane for facilitating storage of energy as pressure within the washer fluid pressure tank.

14. A method for controlling a window and/or lamp washer system for a vehicle, wherein the system comprises a washer fluid container, a washer fluid pump arranged in fluid communication with the washer fluid container, and at least one washer fluid pressure tank for storing pressurized fluid, arranged in fluid communication with the washer fluid pump, and comprising a fluid inlet for receiving pressurized fluid from the washer fluid pump and at least one fluid outlet for providing pressurized fluid in the form of a washer fluid jet, the method comprising:
    measuring pressure in the at least one washer fluid pressure tank; and
    operating the washer fluid pump to pump washer fluid from the washer fluid container to the at least one washer fluid pressure tank and increase the pressure, when the pressure is below a predetermined value;
    wherein the at least one washer fluid pressure tank comprises a compressible air pocket or a spring assembly.

15. The method according to claim 14 wherein the system further comprises at least one controllable valve in fluid communication with the at least one fluid outlet, and at least one washer fluid jet nozzle in fluid communication with the at least one controllable valve, and wherein the method further comprises:

controlling the at least one controllable valve to release washer fluid from the washer fluid pressure tank to the at least one washer fluid jet nozzle, to thereby spray washer fluid upon a windshield or headlight.

16. The method for controlling a window and/or lamp washer system according to claim 14, the method further comprising operating the washer fluid pump as a response to controlling the at least one controllable valve.

17. The method according to claim 14 wherein the at least one washer fluid pressure tank comprises the spring assembly, and the spring assembly includes a membrane for facilitating storage of energy as pressure within the at least one washer fluid pressure tank.

18. A window and/or lamp washer system for a vehicle comprising;

a washer fluid container;

a washer fluid pump arranged in fluid communication with the washer fluid container;

at least one washer fluid pressure tank for storing pressurized fluid, arranged in fluid communication with the washer fluid pump, and comprising a fluid inlet for receiving pressurized fluid from the washer fluid pump and at least one fluid outlet for providing pressurized fluid in the form of a washer fluid jet;

sensor means arranged to provide a signal representing measured pressure within the at least one washer fluid pressure tank;

a control unit connected to the sensor means and the washer fluid pump, and arranged to receive the signal;

at least one controllable valve in fluid communication with the at least one fluid outlet;

at least one washer fluid jet nozzle in fluid communication with the at least one controllable valve; and a pressure throttling device arranged in between the at least one washer fluid jet nozzle and the at least one controllable valve;

wherein the at least one controllable valve is operable to release washer fluid from the at least one washer fluid pressure tank to the at least one washer fluid jet nozzle, and wherein the control unit is configured to operate the washer fluid pump based on the signal, whereby, when the signal indicates a pressure below a predetermined value, the control unit is configured to operate the washer fluid pump to pump washer fluid from the washer fluid container to the at least one washer fluid pressure tank and increase the pressure in the at least one washer fluid pressure tank.

19. The window and/or lamp washer system according to claim 18 wherein the at least one washer fluid pressure tank comprises a compressible air pocket or a spring assembly.

20. The window and/or lamp washer system according to claim 19 wherein the at least one washer fluid pressure tank comprises the spring assembly, and the spring assembly includes a membrane for facilitating storage of energy as pressure within the at least one washer fluid pressure tank.

* * * * *